Nov. 12, 1957  M. L. LEITH, JR  2,812,921
ELECTROMAGNETIC PIPE LINE CLEAN-OUT MEANS
Filed July 6, 1955
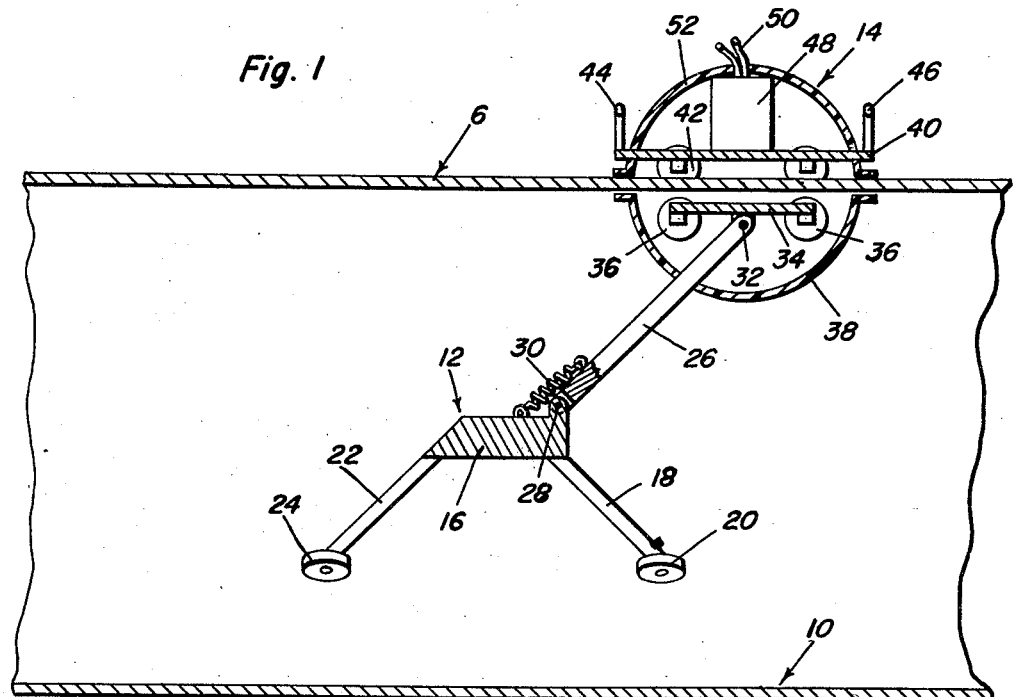
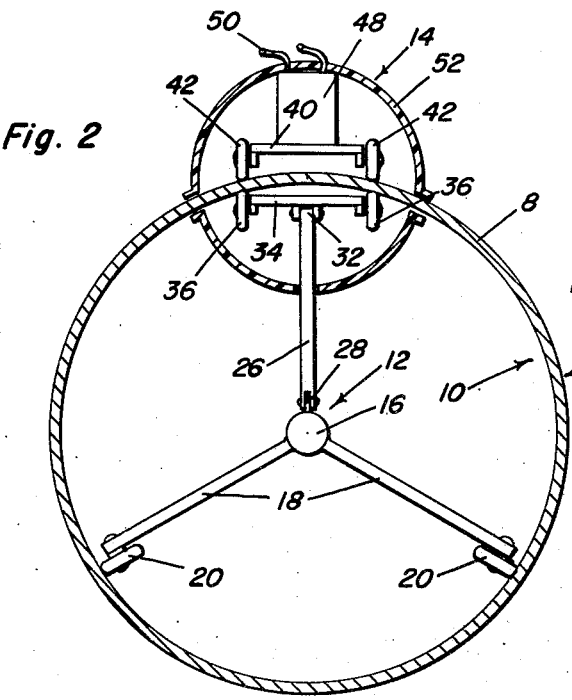
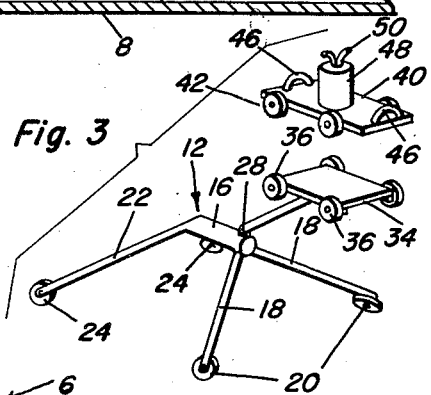
Martin L. Leith, Jr.
INVENTOR.
BY *Clarence A. O'Brien*
*and Harvey B. Jacobson*
Attorneys United States Patent Office 2,812,921
Patented Nov. 12, 1957

2,812,921

ELECTROMAGNETIC PIPE LINE CLEAN-OUT MEANS

Martin L. Leith, Jr., Avenel, N. J.

Application July 6, 1955, Serial No. 520,283

3 Claims. (Cl. 254—134.5)

The present invention relates to a novel structural device which is appropriately designed for confinement in the bore or passageway of a pipe line, or an equivalent conduit, which is implemented with means for moving debris or any equivalent accumulated media, which also serves additional purposes to be hereinafter revealed, and which is novel in that it is suitably constructed to be maneuvered by a manually regulable and controllable electromagnet.

Stated otherwise, the invention comprehends the adoption and use of a wheel-equipped mobile carriage which may be caused to roll, reciprocate or otherwise travel in the passageway under the influence of electromotive forces in a manner and for specific purposes herein under consideration.

In carrying out the inventive concept, one objective has been to provide means of the stated type susceptible of advantageous use in conducting or moving testing materials through pipe lines, the carriage which is purely mechanical being actuatable in the passageway and subject to the driving power and forces of manually regulable and manipulatable means on the exterior of the pipe, the latter means constituting a simple electromagnet for indirectly driving the carriage back and forth.

It is also an object of the invention to provide a construction for moving any appropriate instrumentality or device such as radioisotopes for radiographic weld inspection requirements, clean-out cables and equivalent implements.

In carrying out a preferred embodiment of the invention a simple and economical so-called mobile carriage is used. This is preferably a hub-like body with forward and rear legs in pairs and with the legs is divergent relationship and provided on their pipe contacting ends with freely turnable rollers. This provides what is sometimes called a frame and is used as the support means for conveying or otherwise propelling the clean-out or other device (not shown). A drive plate is connected by a drawbar or the like, to the carriage and is steered and moved by motivating forces caused to come into play from the complemental exteriorly arranged electromagnetic powering unit.

Other objects, features and advantages will become more readily apparent from the following description and the accompanying sheet of drawings.

In the drawings, wherein like numerals are employed to designate like parts throughout the views:

Figure 1 is a fragmentary sectional and elevational view showing a portion of a pipe line or conduit and the two complemental units, one on the inside and the other on the outside and in cooperative relationship.

Figure 2 is an end view of the structure seen in Figure 1 observing the same in a direction from right to left and with the parts of the principal units appearing in elevation.

Figure 3 is a perspective view of a so-called exploded type based on a smaller scale.

Referring now to the drawings with the aid of reference numerals the conduit or so-called pipe line is denoted generally by the numeral 6, the exterior surface being designated at 8 and the bore or internal passageway being denoted by the numeral 10. It is in this passageway that the vehicle-like mobile carriage is arranged and operable. This unit of the overall assemblage is denoted by the numeral 12. The powering exteriorly disposed unit or component is denoted by the numeral 14.

Reverting to the carriage this is also sometimes treated as a leg-equipped frame. More specifically, it comprises a cylindrical axially disposed body 16 which is also sometimes referred to as a hub. This is provided with a pair of forward outwardly and downwardly diverging legs 18 arranged at 45° angles and provided on their so-called "lower" ends with freely idling traction rollers 20. At the trailing end there are correspondingly outwardly and downwardly diverging legs 22 which converge where they join with the body and have their opposite spreading ends provided with idling rollers 24. The leading end on the top side is provided with an upwardly inclined push-pull draft bar or arm 26 which is hingedly attached to the body, as at 28, there being a coil spring 30 which is attached to one end of the body and the opposite end to the hinged drawbar. The upper end of the drawbar is hinged at 32 to a driver plate. This is a flat rectangular steel, or equivalent plate, 34 having freely mounted rollers or wheels 36 which have rolling contact with the wall of the bore. Any appropriate cover or shield of insulation is provided, as at 38.

The exterior unit comprises a rectangular platform 40 with wheels or rollers 42 in rolling contact with the surface 8, said platform being provided at its forward and rear ends with suitable hand-grips 44 and 46. The platform carries an electromagnet 48 having a conducting cord, or the like, 50 connected thereto. The shield is denoted at 52.

It will be clear that the over-all apparatus or machine is therefore characterized by a lightweight, non-magnetic (aluminum or magnesium) frame with wheel-equipped legs set at 45° angles from the common hub or center. This hub or center is located in the pipe with 120° of the circumference of the pipe separating each of the wheels of a driving plate 34. The driving plate is constructed of steel and fitted with four non-magnetic wheels mounted on a non-magnetic drawbar 26 which is suitably hinged or pivoted. The plastic shield serves to prevent picking up of steel shavings.

On the outside of the pipe there is the electromagnetic fitted with four non-magnetic wheels and covered with a plastic shield and having two hand-grips attached to the base or platform. The electromagnet is powered from an outside power supply through the conductor cable or wire 50. The over-all apparatus or machine operates when the electromagnet means or unit 14 is energized, thus setting up a magnetic field which attracts the driver plate 34. When the energized electromagnet is rolled along the pipe on its wheels by a man holding the hand-grips, the magnetic field forces the roller-equipped plate 34 to follow thus moving the frame and hub through the pipe. This in turn moves any device which is fastened to the carriage such as radioisotopes or radiographic weld inspection, clean-out cables and so on.

As already touched upon, this machine has a definite advantage as a method of propelling testing materials through a pipe line since it is not dependent on electrical or mechanical motors inside the pipe such as require a power supply, or which, in turn, might add needless bulk to the equipment. Nor does this machine require long internal electrical cables for sufficient traction since it is wholly dependent on an external power supply to generate the magnetic field which constitutes the only means of propulsion.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in operating a clean-out implement, cable or the like, in the passageway of a confining conduit, a first unit comprising a mobile carriage, said carriage embodying a hub-like body provided with legs having freely rotatable rollers, a rigid drawbar hingedly connected at one end with the leading end of said body, a plate connected to the opposite end of said bar and provided with a plurality of marginally arranged freely rotatable rollers, and a second unit, the latter embodying an electromagnet, characterized by a platform having rollers to contact the exterior surface of the conduit, an electromagnet mounted on said platform, and hand-grips fixedly mounted on leading and trailing end portions of said platform.

2. For use in dragging a clean-out implement, cable or the like through the passageway of a conduit, a mobile carriage designed to be confined and operated in said passageway in a manner to travel from end to end, a rigid push-pull draft bar operatively connected to said carriage, an adaptable attraction member operatively connected with said bar, and a manually maneuverable and steerable electromagnet adapted to ride along the exterior of said conduit, the electromotive forces capable of generation in and by way of said electromagnet serving to attract said member and thereby propel said carriage much in the manner in which it would function if driven by an electric motor or other prime mover coacting therewith, said carriage embodying a leg-equipped body providing a frame and said legs being provided with freely turnable rollers.

3. For use in dragging a clean-out implement, cable or the like through the passageway of a conduit, a mobile carriage designed to be confined and operated in said passageway in a manner to travel from end to end, a rigid push-pull draft bar operatively connected to said carriage, an adaptable attraction member operatively connected with said bar, and a manually maneuverable and steerable electromagnet adapted to ride along the exterior of said conduit, the electromotive forces capable of generation in and by way of said electromagnet serving to attract said member and thereby propel said carriage much in the manner in which it would function if driven by an electric motor or other prime mover coacting therewith, said carriage comprising a hub-like body provided with a pair of forward legs and a pair of rearward legs spaced lengthwise in respect to each other and diverging outwardly from said body and provided at their ends remote from said body with freely turnable rollers.

References Cited in the file of this patent
UNITED STATES PATENTS

| | | |
|---|---|---|
| 2,514,116 | Baker | July 4, 1950 |
| 2,604,521 | Boucher | July 22, 1952 |